US010439238B2

(12) United States Patent
Riley et al.

(10) Patent No.: US 10,439,238 B2
(45) Date of Patent: Oct. 8, 2019

(54) CONTROL OF FUEL CELL COOLING SYSTEM IN A VEHICLE

(71) Applicant: Ford Global Technologies, LLC, Dearborn, MI (US)

(72) Inventors: Matthew Riley, Ann Arbor, MI (US); Craig Michael Mathie, White Lake Township, MI (US); William Frederick Sanderson, Jr., Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 641 days.

(21) Appl. No.: 15/210,942

(22) Filed: Jul. 15, 2016

(65) Prior Publication Data

US 2018/0019485 A1    Jan. 18, 2018

(51) Int. Cl.
| | |
|---|---|
| *H01M 8/04228* | (2016.01) |
| *H01M 8/04303* | (2016.01) |
| *H01M 8/04223* | (2016.01) |
| *H01M 8/0432* | (2016.01) |
| *H01M 8/04701* | (2016.01) |
| *H01M 8/04955* | (2016.01) |
| *H01M 8/1004* | (2016.01) |
| *H01M 8/24* | (2016.01) |
| *H01M 8/04029* | (2016.01) |
| *H01M 8/04007* | (2016.01) |
| *B60L 50/72* | (2019.01) |
| *B60L 58/32* | (2019.01) |
| *B60L 58/33* | (2019.01) |
| *H01M 8/1018* | (2016.01) |

(52) U.S. Cl.
CPC ........ *H01M 8/04228* (2016.02); *B60L 50/72* (2019.02); *B60L 58/32* (2019.02); *B60L 58/33* (2019.02); *H01M 8/04029* (2013.01); *H01M 8/04037* (2013.01); *H01M 8/04231* (2013.01); *H01M 8/04253* (2013.01); *H01M 8/04303* (2016.02); *H01M 8/04358* (2013.01); *H01M 8/04723* (2013.01); *H01M 8/04955* (2013.01); *H01M 8/1004* (2013.01); *H01M 8/24* (2013.01); *H01M 2008/1095* (2013.01); *H01M 2250/20* (2013.01); *Y02T 90/32* (2013.01)

(58) Field of Classification Search
CPC ......... H01M 8/04228; H01M 8/04303; H01M 11/1883
See application file for complete search history.

(56) References Cited

U.S. PATENT DOCUMENTS

| | | |
|---|---|---|
| 7,883,810 B2 | 2/2011 | Fagley et al. |
| 8,574,776 B2 | 11/2013 | Clingerman et al. |
| 8,900,766 B2 | 12/2014 | Rogahn et al. |

(Continued)

*Primary Examiner* — Abdullah A Riyami
*Assistant Examiner* — Nader J Alhawamdeh
(74) *Attorney, Agent, or Firm* — David Kelley; Brooks Kushman P.C.

(57) ABSTRACT

A fuel cell system in a vehicle includes a fuel cell stack and a cooling system for cooling the fuel cell stack. The cooling system has a radiator and at least one pump configured to supply coolant to the fuel cell stack. A controller operates the cooling system to actively cool the fuel cell stack while the vehicle is shut down in response to conditions indicating that the next time the vehicle will be started, it will be a cold start. The controller can then, subsequent to initiating the cooling, purge the fuel cell stack.

19 Claims, 5 Drawing Sheets

(56) References Cited

U.S. PATENT DOCUMENTS

| | | |
|---|---|---|
| 9,070,921 B2 | 6/2015 | Cartwright et al. |
| 2009/0169928 A1* | 7/2009 | Nishimura ........ H01M 8/04037 |
| | | 429/415 |
| 2009/0208796 A1* | 8/2009 | Matsuo ............. H01M 8/04029 |
| | | 429/429 |
| 2014/0093801 A1* | 4/2014 | Rogahn ............ H01M 8/04225 |
| | | 429/429 |
| 2015/0030946 A1 | 1/2015 | Darling et al. |
| 2015/0099200 A1* | 4/2015 | Staley ..................... B60L 1/003 |
| | | 429/413 |
| 2016/0375792 A1* | 12/2016 | Kazuno .............. B60L 11/1887 |
| | | 320/101 |
| 2016/0380282 A1* | 12/2016 | Maruo .............. H01M 8/04179 |
| | | 429/414 |
| 2018/0019485 A1* | 1/2018 | Riley ................ H01M 8/04303 |

* cited by examiner

CONTROL OF FUEL CELL COOLING SYSTEM IN A VEHICLE

TECHNICAL FIELD

This disclosure relates to a cooling system for a fuel cell stack in a vehicle, and methods and systems for controlling the same.

BACKGROUND

Fuel cells, such as hydrogen fuel cells, are one possible alternative energy source for powering vehicles. In general, fuel cells include a negative electrode (anode), an electrolyte, and a positive electrode (cathode). In a proton exchange membrane fuel cell (PEMFC), the electrolyte is a solid, proton-conducting membrane that is electrically insulating but allows protons to pass through. Typically, the fuel source, such as hydrogen, is introduced at the anode using a bipolar or flow field plate where it reacts with a catalyst and splits into electrons and protons. The protons travel through the electrolyte to the cathode and the electrons pass through an external circuit and then to the cathode. At the cathode, oxygen in air introduced from another bipolar plate reacts with the electrons and the protons at another catalyst to form water.

During operation of the system, the water byproduct may accumulate in the fuel cell stack. If left in the fuel cell stack to be influenced by cold ambient temperatures, the water may freeze. To prevent frozen water from accumulating, fluid can be sent through the fuel cell to remove materials from the fuel cell stack when the vehicle is shut down in a process known as fuel cell purging.

SUMMARY

In one embodiment, a vehicle includes a fuel cell stack, and a cooling system that has a radiator and at least one pump and that is configured to supply coolant to the fuel cell stack. At least one controller is programmed to operate the cooling system to actively cool the fuel cell stack while the vehicle is shut down in response to an anticipated upcoming cold start.

In another embodiment, a vehicle includes a fuel cell stack and a pump configured to deliver coolant to the fuel cell stack. The vehicle has means for shutting down and starting the vehicle. A controller is programmed to, in response to the vehicle being shut down and a frozen start anticipated for a next vehicle startup, operate the pump to actively cool the fuel cell stack.

In another embodiment, a method of controlling a fuel cell cooling system in a vehicle includes first shutting down the vehicle. Then, while the vehicle is shut down, a fuel cell coolant pump is operated in response to a temperature of a fuel cell coolant being less than a threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
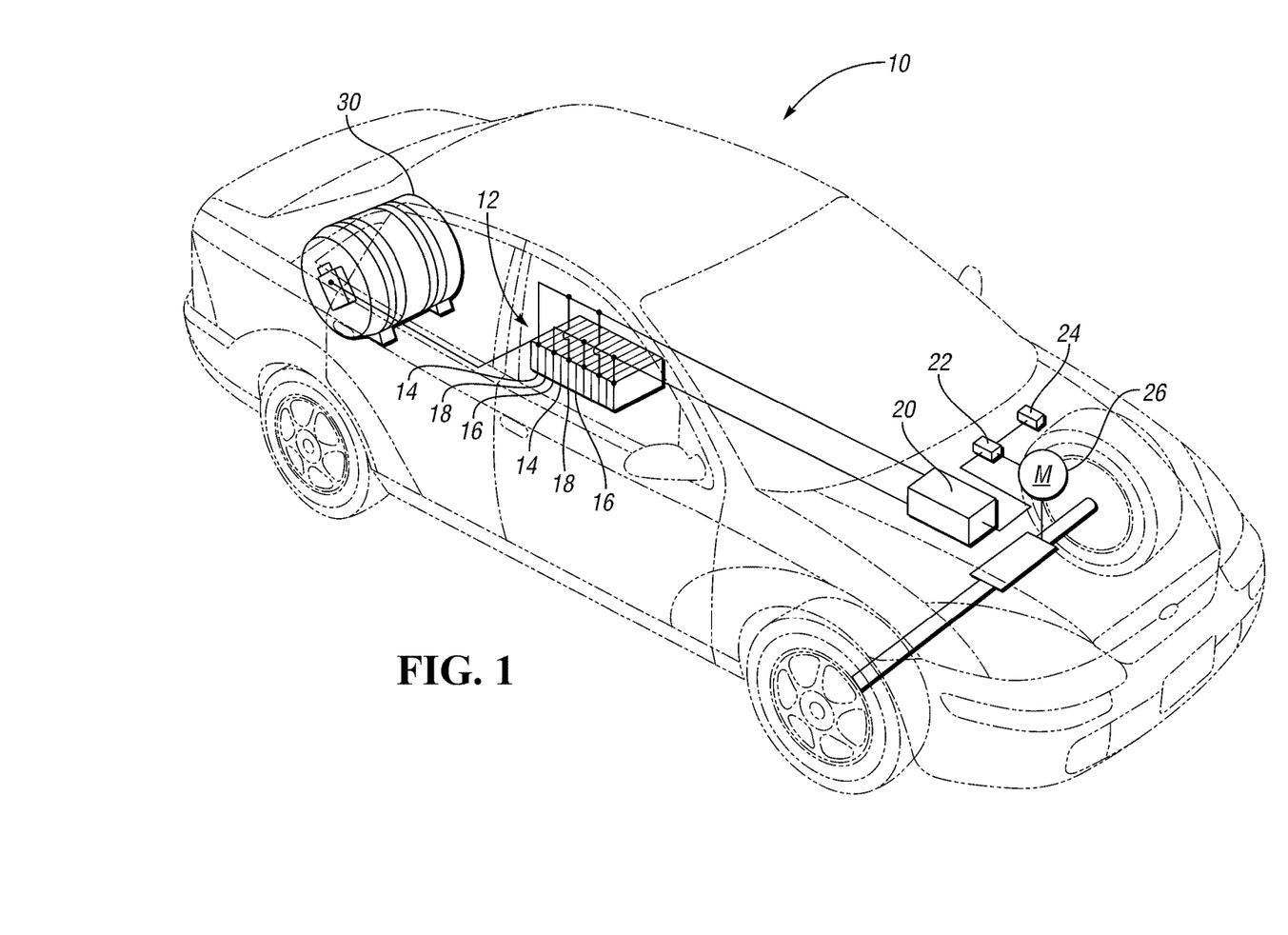
FIG. 1 is a schematic illustration of a fuel cell system in a vehicle, according to an embodiment.

Referring to FIG. 1, a vehicle 10 is illustrated with a fuel cell stack 12 for powering the vehicle 10. The vehicle 10 of FIG. 1 is a car, however it should be understood that the vehicle 10 can also be other vehicles such as a truck, an off-road vehicle, or an urban vehicle. As will be further described below, the cells of the stack 12 may include an anode 14, a cathode 16, and a membrane 18 therebetween. In this fashion, the fuel cell 12 may be a proton exchange membrane fuel cell (PEMFC) 12.

The stack 12 electrically communicates with and provides energy to a high voltage bus 20. The high voltage bus 20 electrically communicates with and provides energy to a DC-to-DC converter 22. The DC-to-DC converter 22 electrically communicates with both a battery 24 and a traction motor 26. The traction motor 26 is connected to one or more wheels to propel the vehicle.

While the fuel cell stack 12 is illustrated as supplying power for the traction motor 26, it should be understood that the fuel cell stack 12 may additionally or separately be used to power other parts of the vehicle 10 (e.g., accessories) without departing from the scope of the present disclosure.

A primary fuel source 30 is connected to the fuel cell stack 12. In one embodiment, the primary fuel source 30 is a storage tank of high-pressure hydrogen or a storage device of hydride. The primary fuel source 30 supplies the fuel cell stack 12 with the primary fuel (e.g., high-pressure hydrogen or hydride) to react with oxygen in the air (supplied by a compressor in one embodiment) to power the vehicle, according to one embodiment.

Figure 2:
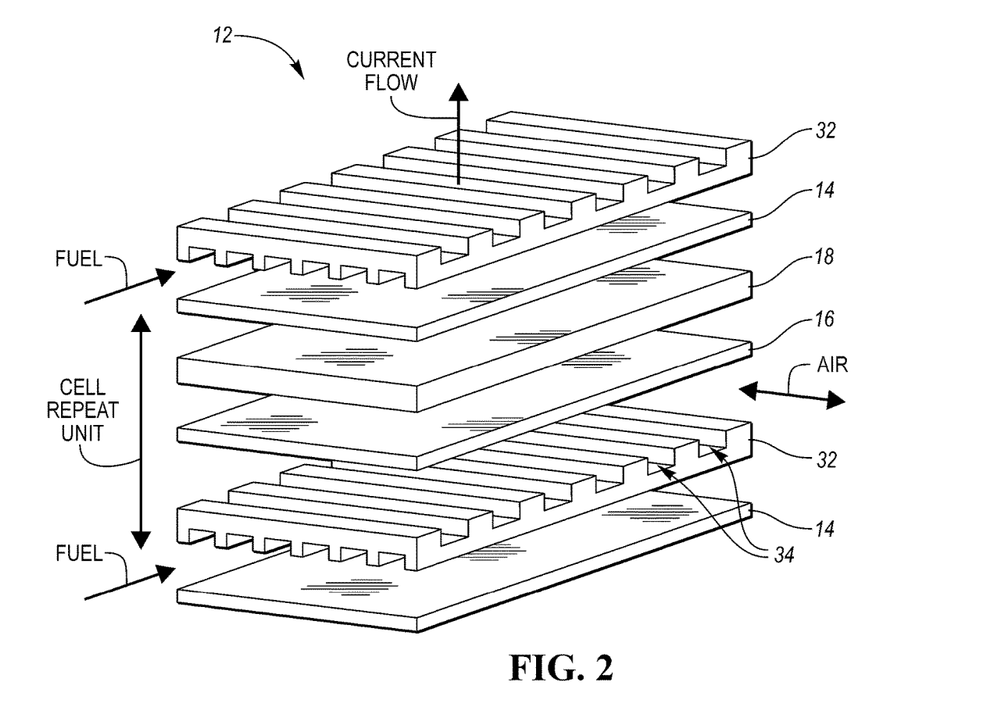
FIG. 2 is an exploded perspective view of a portion of a proton exchange membrane fuel cell (PEMFC), according to an embodiment.

FIG. 2 illustrates an example of a portion of a proton exchange membrane fuel cell (PEMFC) stack 12, such as the fuel cell stack 12 of FIG. 1. The PEMFC 12 generally includes a negative electrode (anode) 14 and a positive electrode (cathode) 16, separated by a proton exchange membrane (PEM) 18 (also a polymer electrolyte membrane). The anode 14 and the cathode 16 may each include a gas diffusion layer (GDL), a catalyst layer, and a bipolar or flow field plate 32 which forms a plurality of gas channels 34. The anode catalyst layer may facilitate the splitting of hydrogen atoms into hydrogen ions and electrons while the cathode catalyst layer facilitates the reaction of oxygen gas, hydrogen ions, and electrons to form water. In addition, the anode 14 and cathode 16 may each include a microporous layer (MPL) disposed between the GDL and the catalyst layer.

The channels 34 of the bipolar plates 32 may be configured to carry gases. The channels 34 may carry air or fuel (e.g., hydrogen). As shown in FIG. 2, the plates 32 and channels 34 may be rotated 90 degrees relative to each other. Alternatively, the plates 32 and channels 34 may be oriented in the same direction. The materials of the plates 32 is such that it is electrically conductive and corrosion resistant under proton exchange membrane fuel cell (PEMFC) operating conditions to ensure that the bipolar plate perform its functions—feeding reactant gases to the membrane electrode assembly (MEA) and collecting current from the MEA.

Figure 3:
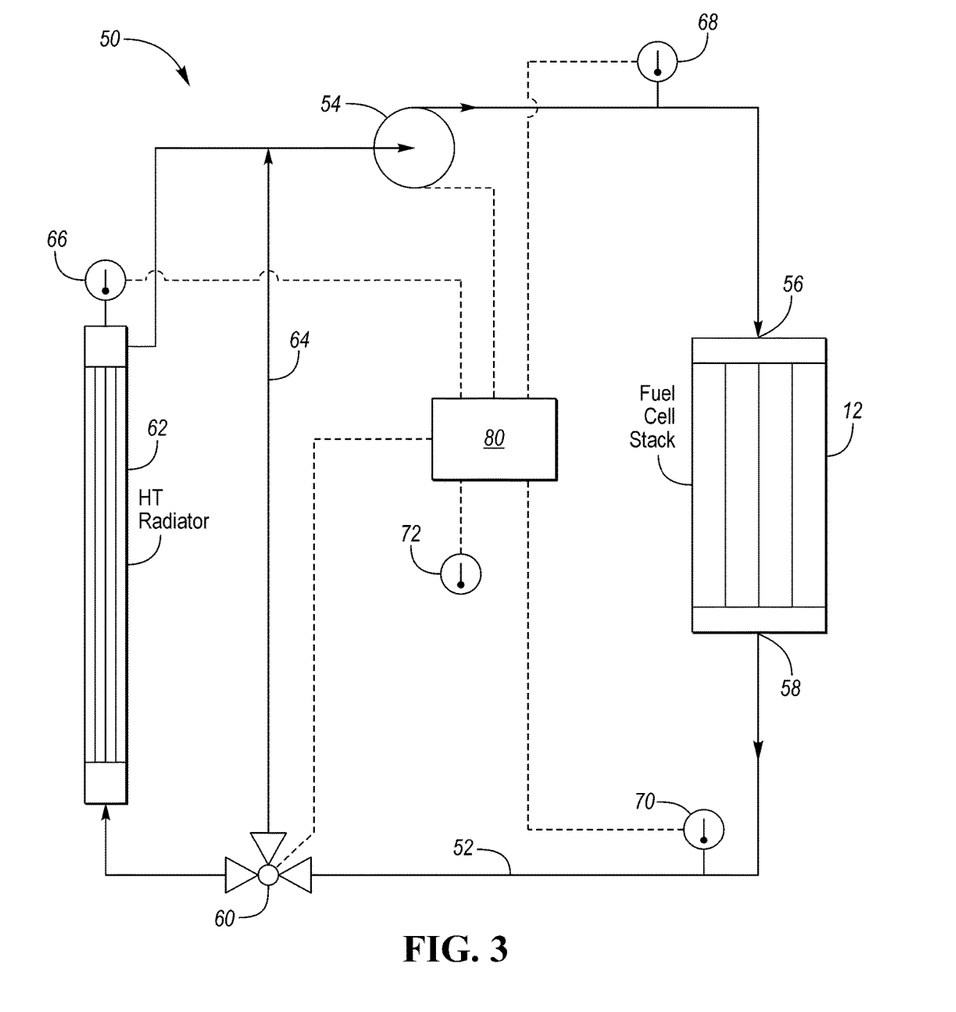
FIG. 3 is a schematic illustration of a cooling system for the fuel cell, according to an embodiment.

FIG. 3 is a schematic overview of a cooling system 50 for cooling the fuel cell stack, such as the fuel cell stack 12 of FIGS. 1-2. The system 50 utilizes conduits that form a cooling loop 52 for supplying and conditioning coolant (e.g., water, glycol/water mixture, thermal oil, etc.) supplied to the fuel cell 12. At least one pump 54 supplies the coolant to an inlet 56 of the fuel cell 12. The coolant then travels toward a three-way valve 60. The valve 60 can be operated to either send the coolant to a radiator or to bypass the radiator, based on the temperature of the coolant and a desired temperature of the fuel cell. If the coolant is sent to the radiator 62, the radiator 62 utilizes fans to perform heat exchange methods to reduce the coolant temperature while increasing the surrounding air temperature. If no additional cooling is necessary, the three-way valve 60 is operated to direct at least some of the coolant to a bypass line 64 where the coolant is returned to the pump 54.

A plurality of temperature sensors can be placed throughout the cooling loop 52 for measuring the temperature of the coolant and ambient air. In the example shown in FIG. 3, one temperature sensor 66 is located at the outlet of the radiator 62, another temperature sensor 68 is located between the pump 54 and the fuel cell inlet 56, another temperature sensor 70 is located between the fuel cell outlet 58 and the valve 60, and another temperature sensor 72 is located in an area appropriate for measuring ambient air temperature. Each of the temperature sensors is coupled to a controller 80. The controller 80 can be a single controller, or can be multiple controllers coupled to one another and cooperatively programmed to carry out the functions described herein. The controller 80 is programmed to operate the pump 54 and the valve 60 to control the temperature and the amount of coolant flowing into the fuel cell 12 based on various temperature outputs from the temperature sensors 66, 68, 70, 72.

During operation of the system, product water, residual fuel such as hydrogen, and byproducts such as nitrogen may accumulate at the anode side of the stack 12. One or more fuel cells in the fuel cell stack can go into reversal (cell voltage of around −1V or lower) due to lack of sufficient hydrogen at the anode catalyst. The hydrogen can be inhibited from getting to the catalyst because the flow through the anode is restricted by ice blocking the anode outlet pathway of the fuel cells. This can create a blockage, trapping other materials (e.g., nitrogen, argon, water vapor) within the fuel cell, which can inhibit the ability of new hydrogen to enter the cell and react properly. Attempts have been made to remove the liquid product water and byproducts and to reuse the residual hydrogen and at least a portion of the water vapor. Methods known as "stack purges" are known, in which fluid is sent through the fuel cell to remove materials from the fuel cell stack when the vehicle is shut down. This can occur while maintaining or increasing the temperature of the fuel cells. One example of a stack purge is disclosed in U.S. patent application Ser. No. 14/047,449, which is incorporated by reference herein. However, continuing to conduct a stack purge after some time has passed since the shutdown can cause water in the reactant gases to condense due to the reducing temperatures of the fuel cell after shutdown. The stack purge may not be effective when there is little control or if the water condenses prior to the purge. Frozen water in the system can cause fuel cell startup problems.

According to various aspects of this disclosure, the cell stack is purposefully and actively cooled in a controlled fashion to encourage timely and thorough water condensation in the cathode and anode flow channels, and then is purged with reactant gases to propel the condensate out of the stack prior to the stack reaching freezing temperatures. During the cool down phase after shutdown, coolant in the radiator and plumbing outside of the stack cools down more rapidly than the cell stack (or at least the majority of the stack). The vehicle controls are programmed to monitor the ambient temperature and temperature of the coolant external to the stack. Once the ambient temperature and coolant reach a trigger temperature that is close to but somewhat above freezing (e.g., 10-15° C.), it is reasonable that the ambient temperature may drop further and become cold enough prior to the next start that a freeze startup may be required. This ambient temperature at shutdown can be combined with other data such as time of day, GPS data and/or weather forecast data or a manual input (button or smart phone app) from the driver to refine the use of this threshold to anticipate the likelihood of the following startup being a frozen startup (FSU). Once the threshold is reached, the vehicle can use the cold ambient air and radiator to force-cool the coolant and then the fuel cell stack during the shutdown sequence (e.g., during the stack conditioning step).

Figure 4:
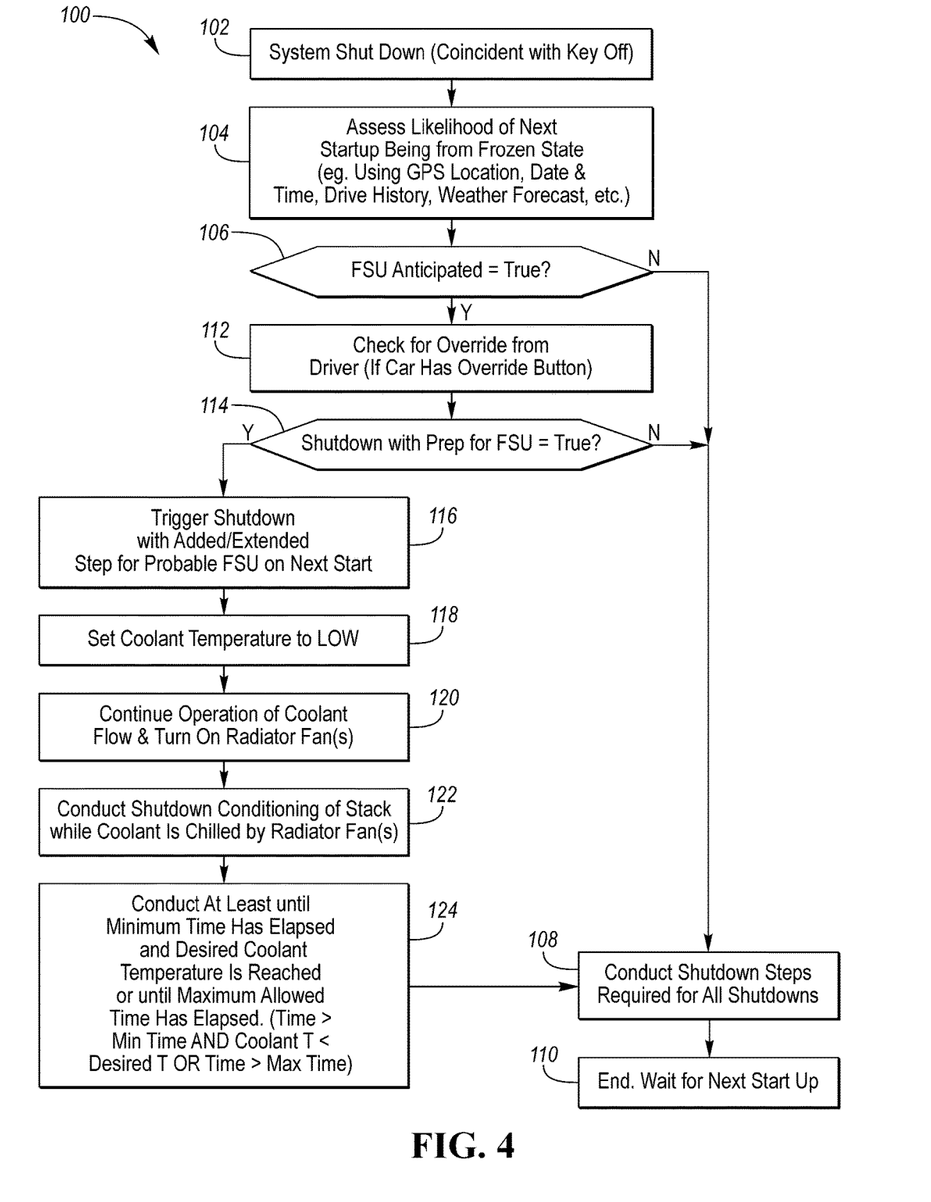
FIG. 4 is a flow chart representing an algorithm implemented by a control system for actively cooling the fuel cell after vehicle shutdown, according to an embodiment.

FIG. 4 is a flowchart illustrating an algorithm 100 programmed to be implemented by one or more controllers disclosed herein. At 102, the controller recognizes a system shutdown, indicated by the ignition key being turned to the "off" position, for example. In other words, the controller receives a shutdown signal in response to the key being turned to the "off" position. The vehicle may be equipped with a means for shutting down the vehicle. For example, an ignition switch, key receptacle, button, user interface, etc. may be coupled to the controller that, when operated by the user, signal a desire to "turn on" or "turn off" the vehicle. When the vehicle is "turned on" by the means, it enables the user to change gear into drive and propel the vehicle. When the vehicle is "turned off" by the means, the vehicle may disable the ability to shift into drive gear, disable supplying of the fuel, and accomplish other activity associated with other vehicles.

At 104, the controller assesses the likelihood of the next startup being from a frozen state. This can be accomplished utilizing the ambient air temperature, GPS location, date and time, drive history or patterns of vehicle operation, weather forecast, etc. For example, the controller can communicate with the GPS system in the vehicle to determine a location of the vehicle, and the date and time. That data can allow the controller to infer a likely FSU upcoming. For example, the vehicle may be located in Detroit, Mich. in January, which would indicate that a likely FSU is upcoming. However, if the vehicle is located in Las Vegas, Nev. in August, an upcoming FSU is not likely.

This data can also be coupled with driver history. For example, if the vehicle has a history of being started at 7:00 am during the spring months, this may lead to a more likely conclusion of an upcoming FSU than if, for example, the vehicle has a history of being started at 2:00 pm when the temperature may be significantly higher. The weather forecast may be integrated into the vehicle, which can also be combined with driver history and location to better determine an upcoming FSU.

At 106, the controller concludes whether an anticipated FSU is likely, based on the data gathered at 104. If there is no anticipated FSU, the algorithm proceeds to 108 in which the vehicle conducts normal shutdown procedure. At 110, the controller waits for the next startup to initiate any further action.

If, however, there is an anticipated FSU, then at 112 the controller checks for an override from the driver. One example of an override is by the user selecting an option (e.g., pressing a button) that would inhibit the force-cool of the fuel cell stack during shutdown.

With no override selected based on a determination at 114, the algorithm proceeds to 116 in which the modified shutdown procedure is triggered with an added or extended step to account for the FSU on the next vehicle start. As part of this modified shutdown procedure, the desired coolant temperature in the radiator for the fuel cell system is set to a relatively low temperature such that it actively cools the fuel cell stacks. For example, at 120 the coolant flow in the radiator is started (or continued), and one or more radiator fans are turned on to blow ambient air past the radiator coils. This chills the temperature of the coolant at 122, which conditions and force-cools the fuel cell stack.

This step at 120 can be accomplished in various fashions to actively cool the fuel cell stack via the recirculating coolant which is cooled by the radiator fans introducing the ambient air to the radiator. In one example, the controller can operate the pump 54 in a single pulse to move cold coolant from the radiator 62 into the stack 12, followed by a wait period. In another example, the controller can operate the pump to continuously flow coolant until a desired temperature is reached. This process is continued at 124 at least until a minimum time has elapsed ($t>t_{min}$) and a desired coolant temperature is reached ($T_{coolant}>T_{desired}$), or until a maximum allowed time has elapsed ($t>t_{max}$). The desired temperature may be between 10 and 15° C., for example.

Actively cooling the fuel cell stack also promotes isothermal properties in the stack. Making the stack isothermal removes the potential for varying rates or volumes of condensation based on locality. This technique allows the system to condense and remove a larger amount of vapor prior to freeze regardless of location within the stack because the colder coolant from the radiator will cool the stack, and the amount of water that condenses is a strong function of temperature.

Once the conditions above are met at 124, the controller commands the shutdown at 108 and ends at 110, as described above. This can include stack purging, in which hydrogen is blown through the anode channels and air is blown through the cathode channels, both with sufficient flow rates to purge the newly condensed water out of the channels. This ensures water does not freeze in the channels and does not block the flow on the subsequent FSU.

Figure 5:
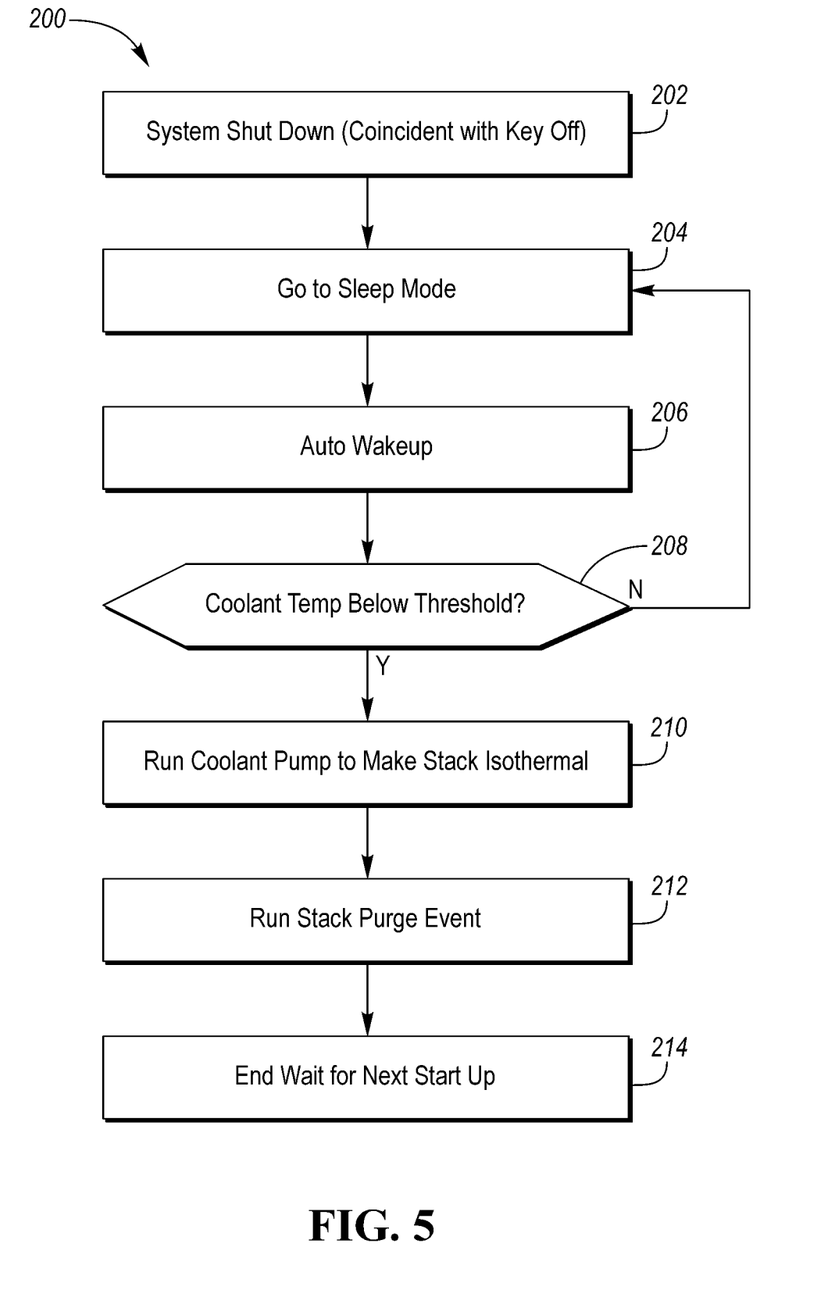
FIG. 5 is a flow chart representing an algorithm implemented by a control system for actively cooling the fuel cell after vehicle shutdown, according to another embodiment.

FIG. 5 illustrates a flow chart of another algorithm 200 that can be implemented by the one or more controllers 80 to force-condense vapor in the fuel cell stack 12 to avoid ice blockages in the anode and cathode channels and vias. In this embodiment, when the stack purge event after shutdown is triggered, the coolant pump is run to make the fuel cell stack isothermal. This is possible because, as in the embodiments described above, the coolant in the radiator 62 and conduits is colder than the stack 12 so that the coolant cools the stack. The radiator 62, in exchange, transfers heat to the cold ambient. In this manner, the maximum amount of vapor would have condensed throughout the system and would be ready for removal via the flow of purge gases described above.

In more detail, first at 202, the controller recognizes a system shutdown, indicated by the ignition key being turned to the "off" position, for example. At 204, the system enters a "sleep mode" in which no commanded or active fluid movement takes place. The system thus cools due to the cooler ambient temperature. During the sleep mode, electrical power flow may be disabled or reduced to a minimal level where no active significant data collection takes place. After some predetermined time passing, the system performs an auto wakeup at 206 to allow the system to collect data regarding the temperature of the coolant in the loop 52 using one or more of the illustrated temperature sensors 66. If the coolant temperature at the stack is below a threshold (e.g., 5-10° C.) at 208, then the controller activates the pump 54 to force the coolant into the stack 12 at 210. This makes the stack 12 more cooler and more isothermal, and removes the possibility of the center of the stack being warmer than the edges of the stack. If the coolant is not below the threshold, the system goes back into the sleep mode.

The duration of the coolant flow event may be several minutes, depending on the flow rate. The temperature at the outlet of the fuel stack 12 and the time duration can be used as feedback signals to trigger the end of this coolant flow phase. The coolant flow phase can end when, for example, the temperature of the fuel stack is detected to be isothermal, e.g., a generally consistent temperature from the outer edges of the stack as compared to the inner regions of the stack.

Once the coolant flow phase at 210 is complete, the controller may return the system back to the sleep mode.

The running of the coolant through the fuel stack 12 prior to a purge creates a better effectiveness of the later purge event, which can optionally be performed at 212 according to the methods explained above. The purge event follows the delayed force-cool event such that the water that is condensed during the force is cooled before the water has a chance to freeze. If the delay is too long, the water undesirably freezes in the channels. The timing of the delay can be determined empirically for each specific system, but one example, the purge event would follow the force-cool within ten minutes if the force cool is triggered at a 5-10° C. coolant temperature.

At 214, the control system ends and waits for the next system start, indicated by the key being turned to an "on" position, for example.

Bringing the fuel cell to a lower temperature at shutdown has benefits of improving hydrogen protection in two ways. First, there are less pressure changes in the system. In particular, the system is not spending as much time under vacuum pressure and/or experiencing a weaker vacuum pressure. This means that there is less of a driving force to draw in ambient air/oxygen and consume or dilute the hydrogen, and as a result, the hydrogen protection time will be longer. Second, at the end of the shutdown, the gases (e.g., hydrogen) in the fuel cell are colder and thus more dense for a given pressure at the start of the hydrogen protection state. Therefore, the total mass (moles) of hydrogen will be greater, taking more loss of hydrogen or ingress of oxygen to lose the hydrogen protection state. The hydrogen protection state is therefore extended.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle comprising:
a fuel cell stack;
a cooling system having a radiator and at least one pump configured to supply coolant to the fuel cell stack; and
at least one controller programmed to:
operate the cooling system to actively cool the fuel cell stack while the vehicle is shut down in response to an anticipated upcoming cold start, and
purge the fuel cell stack subsequent to a calibratable time delay after at least a portion of the fuel cell stack becomes isothermal and a temperature of the coolant decreases towards a freezing temperature.

2. The vehicle of claim 1, wherein the operation of the cooling system includes activating radiator fans.

3. The vehicle of claim 1, wherein the operation of the cooling system includes operating the at least one pump to send the coolant to the fuel cell stack.

4. The vehicle of claim 1, wherein the anticipated upcoming cold start is defined at least in part by stored driving history.

5. The vehicle of claim 4, wherein the stored driving history includes stored data indicating a plurality of times and locations in which the vehicle was started.

6. The vehicle of claim 1 further comprising a receiver configured to receive data indicative of a weather forecast, wherein the anticipated upcoming cold start is defined at least in part by the weather forecast.

7. The vehicle of claim 1, wherein the at least one controller is further programmed to disable the cooling system in response to an amount of time of cooling system operation exceeding a maximum time threshold.

8. The vehicle of claim 1 further comprising a temperature sensor configured to detect a coolant temperature, wherein the at least one controller is further programmed to disable the cooling system in response to an amount of time of cooling system operation exceeding a minimum time threshold and the coolant temperature being below a desired temperature.

9. A vehicle comprising:
a fuel cell stack;
a pump configured to deliver coolant to the fuel cell stack;
means for shutting down and starting the vehicle; and
a controller programmed to:
in response to the vehicle being shut down and a frozen start anticipated for a next vehicle startup, operate the pump to actively cool the fuel cell stack, and
purge the fuel cell stack subsequent to a calibratable time delay after at least a portion of the fuel cell stack becomes isothermal and a temperature of the coolant decreases towards a freezing temperature.

10. The vehicle of claim 9 further comprising a radiator and a fan associated with the radiator, wherein the controller is further programmed to activate the fan in response to the vehicle being shut down and the frozen start anticipated for the next vehicle startup.

11. The vehicle of claim 9, wherein the frozen start anticipated for the next vehicle startup is based at least in part on a stored driving history of the vehicle.

12. The vehicle of claim 11, wherein the stored driving history includes stored data indicating a plurality of times and locations in which the vehicle was started.

13. The vehicle of claim 9 further comprising a receiver configured to receive data indicative of a weather forecast, wherein the frozen start anticipated for the next vehicle startup is based at least in part on the received weather forecast.

14. The vehicle of claim 9, wherein the controller is further programmed to disable the pump in response to an amount of time of pump operation exceeding a maximum time threshold.

15. The vehicle of claim 9, further comprising a temperature sensor configured to detect a coolant temperature, wherein the controller is further programmed to disable the pump in response to an amount of time of pump operation exceeding a minimum time threshold and the coolant temperature exceeding a desired temperature.

16. A method of controlling a fuel cell cooling system in a vehicle, comprising:
shutting down the vehicle;
while the vehicle is shut down, operating a fuel cell coolant pump in response to a temperature of a fuel cell coolant being less than a threshold; and
purging a fuel cell stack subsequent to a calibratable time delay after at least a portion of the fuel cell stack becomes isothermal and the temperature of the coolant decreases towards a freezing temperature.

17. The method of claim 16 further comprising, prior to the operating, entering a sleep mode in response to the vehicle being shut down, initiating a wake up session from the sleep mode to compare the temperature of the coolant to the threshold, and re-entering the sleep mode in response to the temperature being higher the threshold.

18. The method of claim 17, further comprising repeating the initiating and re-entering until the temperature falls below the threshold.

19. The method of claim 16 further comprising disabling the pump, wherein the purging occurs subsequent to the disabling of the pump.

* * * * *